(12) United States Patent
Lee et al.

(10) Patent No.: US 9,242,573 B2
(45) Date of Patent: Jan. 26, 2016

(54) SYSTEM AND METHOD FOR CONTROLLING AIR SUPPLY OF FUEL CELL VEHICLE

(71) Applicant: Hyundai Motor Company, Seoul (KR)

(72) Inventors: Kyu Il Lee, Gyeonggi-Do (KR); Sung Gone Yoon, Gyeonggi-do (KR); Jae Won Jung, Seoul (KR); Seong Pil Ryu, Busan (KR)

(73) Assignee: Hyundai Motor Company, Seoul (KR)

( * ) Notice: Subject to any disclaimer, the term of this patent is extended or adjusted under 35 U.S.C. 154(b) by 54 days.

(21) Appl. No.: 14/099,248

(22) Filed: Dec. 6, 2013

(65) Prior Publication Data

US 2015/0105952 A1 Apr. 16, 2015

(30) Foreign Application Priority Data

Oct. 11, 2013 (KR) .......................... 10-2013-0121553

(51) Int. Cl.
| | |
|---|---|
| *B60L 11/18* | (2006.01) |
| *B60L 15/20* | (2006.01) |
| *H01M 8/04* | (2006.01) |
| *B60L 1/00* | (2006.01) |

(52) U.S. Cl.
CPC ............. *B60L 11/1881* (2013.01); *B60L 1/003* (2013.01); *B60L 11/1803* (2013.01); *B60L 11/1861* (2013.01); *B60L 11/1887* (2013.01); *B60L 15/2045* (2013.01); *H01M 8/04753* (2013.01); *B60L 2210/10* (2013.01); *B60L 2240/12* (2013.01); *B60L 2240/421* (2013.01); *B60L 2240/423* (2013.01); *B60L 2240/545* (2013.01); *B60L 2240/547* (2013.01); *B60L 2240/549* (2013.01); *B60L 2250/26* (2013.01)

(58) Field of Classification Search
CPC . B60L 11/18; B60L 11/1805; B60L 11/1803; B60L 15/20; B60L 11/1881; H01M 8/04; H01M 8/0438; H01M 8/04753; H01M 8/1881; H01M 8/1883; H01M 8/1887
USPC ........................................................... 701/22
See application file for complete search history.

(56) References Cited

U.S. PATENT DOCUMENTS

| | | | |
|---|---|---|---|
| 2002/0192518 A1* | 12/2002 | Aoyagi et al. | 429/23 |
| 2003/0044658 A1* | 3/2003 | Hochgraf et al. | 429/22 |

(Continued)

FOREIGN PATENT DOCUMENTS

| | | |
|---|---|---|
| JP | 2007-020244 A | 1/2007 |
| JP | 2007-265686 A | 10/2007 |
| JP | 2011-019313 A | 1/2011 |
| KR | 10-2006-0010970 A | 2/2006 |

(Continued)

*Primary Examiner* — John Q Nguyen
*Assistant Examiner* — Nadeem Odeh
(74) *Attorney, Agent, or Firm* — Mintz Levin Cohn Ferris Glovsky and Popeo, P.C.; Peter F. Corless

(57) ABSTRACT

A method for controlling an air supply of a fuel cell vehicle is provided. In particular, an air supply of a fuel cell vehicle is controlled by calculating an available power which is currently being used by a vehicle; calculating a motoring request power from a driving motor, based on the calculated available power and power required by the driving motor; calculating stack request power required in the fuel cell based on a required charging request power and the calculated motoring request power, depending on a state of charge (SOC) of a high voltage battery; and controlling the air supply to the fuel cell depending on the calculated stack request power.

10 Claims, 4 Drawing Sheets

(56) References Cited

U.S. PATENT DOCUMENTS

| | | | |
|---|---|---|---|
| 2009/0105895 A1* | 4/2009 | Shige | 701/22 |
| 2010/0009225 A1* | 1/2010 | Saito | 429/22 |
| 2013/0245871 A1* | 9/2013 | Shirasaka et al. | 701/22 |
| 2014/0248551 A1* | 9/2014 | Kumada et al. | 429/446 |

FOREIGN PATENT DOCUMENTS

| | | |
|---|---|---|
| KR | 10-2007-0106334 A | 11/2007 |
| KR | 10-2011-0055293 A | 5/2011 |
| KR | 10-2013-0036531 A | 4/2013 |

* cited by examiner

SYSTEM AND METHOD FOR CONTROLLING AIR SUPPLY OF FUEL CELL VEHICLE

CROSS-REFERENCE TO RELATED APPLICATION

The present application claims priority to Korean Patent Application No. 10-2013-0121553 filed on Oct. 11, 2013, the entire contents of which is incorporated herein for all purposes by this reference.

BACKGROUND OF THE INVENTION

1. Technical Field

The present invention relates to a system and method for controlling an air supply of a fuel cell vehicle, and more particularly, to a method for controlling an air supply of a fuel cell vehicle capable of improving fuel efficiency by calculating the actual amount of air supply required, based on available power which may be currently used in a vehicle.

2. Description of the Related Art

A fuel cell vehicle includes a fuel cell stack in which a plurality of fuel cells used as a power source are stacked sequentially, a fuel supply system configured to supply hydrogen, and the like, as a fuel to the fuel cell stack, an air supply system configured to supply oxygen as an oxidizing agent required for electrochemical reaction, and a water and heat management system configured to control a temperature of the fuel cell stack, and the like.

In particular, the fuel supply system decompresses compressed hydrogen within a hydrogen tank to supply the decompressed hydrogen to an anode of the stack and the air supply system actuates an air blower to supply external air to a cathode of the stack.

When hydrogen is supplied to the anode of the stack and oxygen is supplied to the cathode, hydrogen ions are separated by catalytic reaction in the anode. The separated hydrogen ions are delivered to a negative electrode, (i.e., the cathode), through an electrolyte membrane and the hydrogen ions and electrodes separated in the anode electrochemically react with oxygen in the negative electrode, thereby obtaining electric energy.

A portion of the electric energy generated in the fuel cell stack may be used as a power source of a driving motor through an inverter and may be used to charge a high voltage battery through a converter.

When positions of an accelerator pedal, a braking pedal, a gear, and the like are input to a controller, the controller may issue a command to a motor control unit to control a driving motor, in which the motor control unit controls a speed and a torque of the driving motor accordingly.

Typically, an air supply control of the fuel cell vehicle is performed by calculating a torque for a driver's acceleration request based on power. In this case, an air supply quantity larger than the currently available power is required, which may lead to reductions in fuel efficiency and performance.

SUMMARY OF THE INVENTION

The present invention has been made in an effort to provide a system and method for controlling an air supply of a fuel cell vehicle capable of controlling an air supply by calculating an available limitation torque based on currently available power and a motor speed.

According to an exemplary embodiment of the present invention, there is provided a method for controlling an air supply of a fuel cell vehicle, including: calculating, by a controller, an available power which is currently used by a vehicle; calculating, by the controller, a motoring request power of a driving motor, based on the calculated available power and power required in the driving motor, calculating, by the controller, a stack request power required in the fuel cell based on a required charging request power and the calculated motoring request power, depending on a state of charge (SOC) of a battery used to provide power to the motor of the vehicle (i.e., a high voltage battery); and controlling the air supply to the fuel cell depending on the calculated stack request power.

The available power may be calculated based on the available power currently used in the fuel cell and a discharge power calculated in the high voltage battery. The currently available power of the fuel cell may be determined by an air supply quantity which is currently supplied to the fuel cell.

The motoring request power may be calculated based on a final torque value which is a sum of an available limitation torque calculated depending on the available power and a driving torque calculated depending on a motion of an accelerator pedal.

The method for controlling an air supply of a fuel cell vehicle may further include: driving the driving motor based on the final torque value. The charging request power may be determined based on a difference between a targeted SOC and a current SOC of the high voltage battery.

An air flow rate required in the fuel cell may be calculated based on the stack request power which is the sum of the motoring request power and the charging request power and a speed of the motor of an air blower may be controlled depending on the calculated air flow rate.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
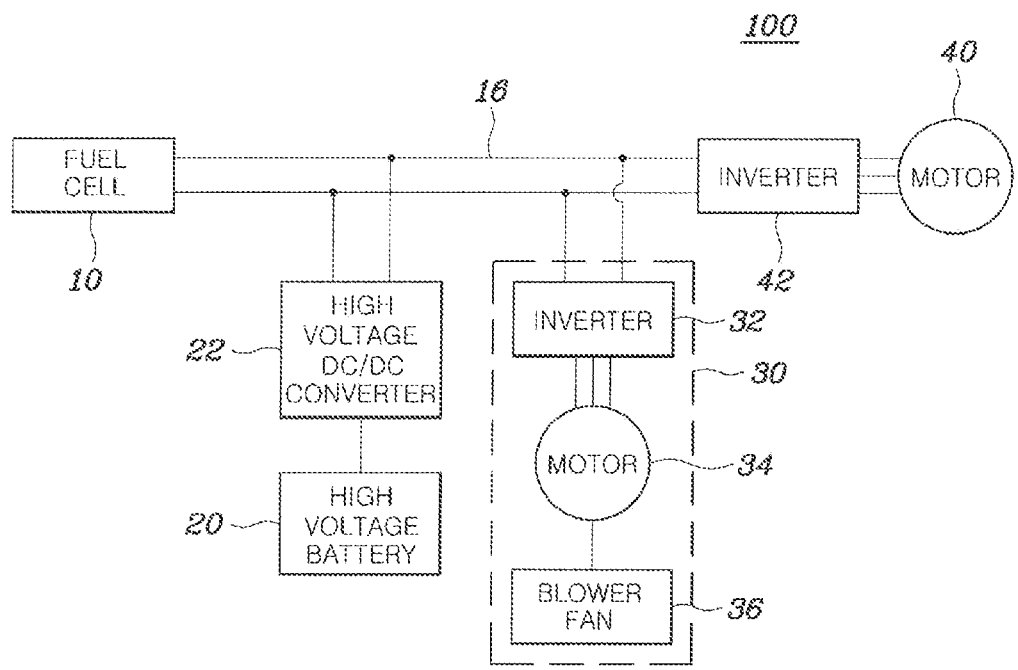
FIG. 1 is a diagram illustrating an electrical connection state of components in a fuel cell vehicle according to an exemplary embodiment of the present invention.

Specifically structural and functional descriptions in exemplary embodiment of the present invention disclosed in the present specification or the present application are illustrated to describe exemplary embodiments of the present invention and therefore, the exemplary embodiments of the present invention may be practiced in various forms and are not to be construed as being limited to the exemplary embodiment of the present invention disclosed in the present specification or the present application.

The exemplary embodiments of the present invention may be variously modified and have various forms and therefore specific exemplary embodiments are illustrated in the accompanying drawings and will be described in detail in the present specification or the present application. However, it is to be understood that the present invention is not limited to the specific exemplary embodiments, but includes all modifications, equivalents, and substitutions included in the spirit and the scope of the present invention.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present invention.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between", "directly between", "neighboring to", "directly neighboring to" and the like, should be similarly interpreted.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof but do not preclude the presence or addition of one or more other features, numerals, steps, operations, components, parts, or a combination thereof.

Unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, exemplary embodiments of the present invention will be described in detail with reference to the accompanying drawings. Like reference numerals proposed in each drawing denote like components.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to, execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

FIG. 1 is a diagram illustrating an electrical connection state 100 of components in a fuel cell vehicle according to an exemplary embodiment of the present invention. As illustrated in FIG. 1, the fuel cell vehicle using a fuel cell and a battery (i.e., a high voltage battery 20) as a power source may include a fuel cell 10 configured to be used as a main power source and supply power to a driving system of a vehicle, a bus terminal 16 configured to connect the fuel cell 10 and a high voltage battery 20 with a first inverter 42, an air blower 30, and the like, a high voltage DC/DC converter 22 configured to receive power from the fuel cell 10, the high voltage battery 20 configured to receive a voltage reduced by the high voltage DC/DC converter 22, the air blower 30 configured to include a second inverter 32, a motor 34, and a blower fan 36. The first inverter 42 is configured to convert power so as to drive a driving motor 40, and the like.

In detail, the fuel cell 10 and the high voltage battery 20 are connected to loads, such as the first inverter 42 and the motor 40, in parallel and are also connected to the air blower 30 in parallel, through the bus terminal 16. The high voltage DC/DC converter 24 connected to the high voltage battery 20 is connected to the bus terminal 16 which is on an output side of the fuel cell 10 to control an output voltage to the bus terminal 16, thereby controlling an output of the fuel cell 10 and an output of the high voltage battery 20.

The first inverter 42 phase-changes power supplied from the fuel cell 10 or the high voltage battery 20 and supplies the phase-changed power to the motor 40, thereby rotating the motor 40. The driving of the motor 40 is configured to include a fuel cell mode which uses only the output of the fuel cell 10, an EV mode which uses only the output of the high voltage battery 20, and a hybrid mode which simultaneously uses the outputs of the fuel cell 10 and the high voltage battery 20.

Output sides of the fuel cell 10 and the high voltage battery 20 are connected to an input side of the air blower 30 and connected to the second inverter 32 as a power module for rotating the motor 34 of the air blower 30 and the motor 34 of the air blower 30 is driven to rotate the a blower fan 36, so that air may be supplied to the fuel cell 10.

Figure 2:
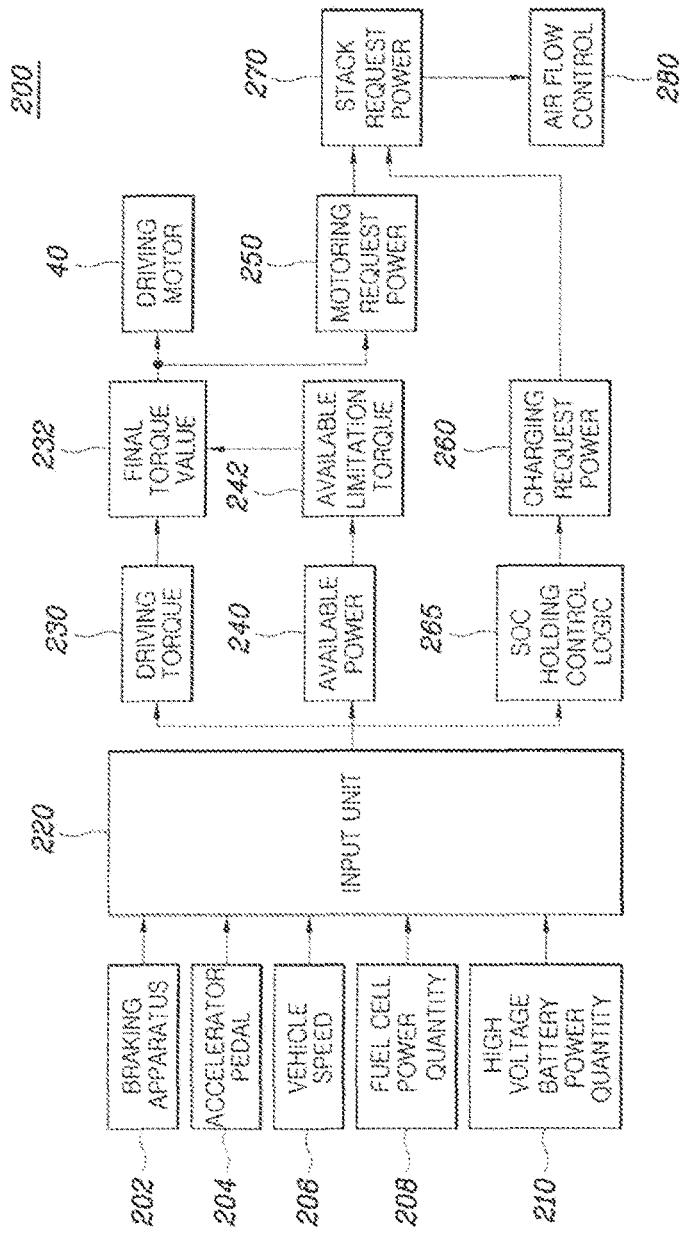
FIG. 2 is a diagram illustrating a flow of an air supply control of the fuel cell vehicle according to the exemplary embodiment of the present invention.

FIG. 2 is a diagram illustrating a flow of an air supply control of the fuel cell vehicle according to the exemplary embodiment of the present invention. Referring to FIGS. 1 and 2, a vehicle controller (not illustrated) in a fuel cell vehicle 200 may receive a braking signal from a braking apparatus 202 such as a brake, an accelerating signal from an accelerator pedal 204 pushed by a driver for acceleration, a signal for a current driving speed 206 of the fuel cell vehicle from a vehicle speed sensor (not illustrated), a signal for a fuel cell power 208 from the fuel cell 10, and a signal for a power 210 from the high voltage battery 20 through an input unit 220. The vehicle controller may control the driving of the driving motor 40, an air supply quantity of the air blower 30, and the like based on the received signals.

In detail, a driving torque 230 may be calculated depending on a driver's acceleration request, that is, an amount the accelerator pedal is pushed by a driver and an available power 240 may be calculated based on the currently available power 208 of the fuel cell 10 and the power 210 discharged from the high voltage battery 20. Further, in a state of charge (SOC) holding control logic based on the signal for the power 210 of the high voltage battery 20, a charging request power 260 required for the charging of the high voltage battery 20 may be calculated. More specifically, the charging request power 260 may be calculated based on a difference between a targeted SOC and a current SOC of the high voltage battery 20, that is, a targeted charging quantity and a current charging quantity.

The vehicle controller may calculate a motoring request power 250 of the driving motor 40 based on the calculated available power 240 and the power requested by the driving motor 40. In detail, the vehicle controller may obtain a final torque value 232 by summing an available limitation torque 242 calculated based on the calculated available power 240 and the driving torque 230 calculated depending on a motion of the accelerator pedal 204 and may calculate the motoring request power 250 based on the calculated final torque value 232. As such, the driving motor 40 may be driven based on the calculated final torque value 232.

Further, a stack request power 270 required in the fuel cell 10 may be calculated based on the motoring request power 250 and the charging request power 260. The vehicle controller may perform an air flow control 280 depending on the calculated stack request power 270. In doing so, the air flow control 280 may be performed by a speed control which changes a rotating speed of the motor 34 of the air blower 30. That is, the stack request power 270 may be a value obtained by summing the motoring request power 250 and the charging request power 260 and the vehicle controller may calculate the air flow required in the fuel cell 10 based on the stack request power 270 and control the speed of the motor 34 of the air blower 30 depending on the calculated air flow, thereby controlling the air supply quantity to the fuel cell 10.

Figure 3:
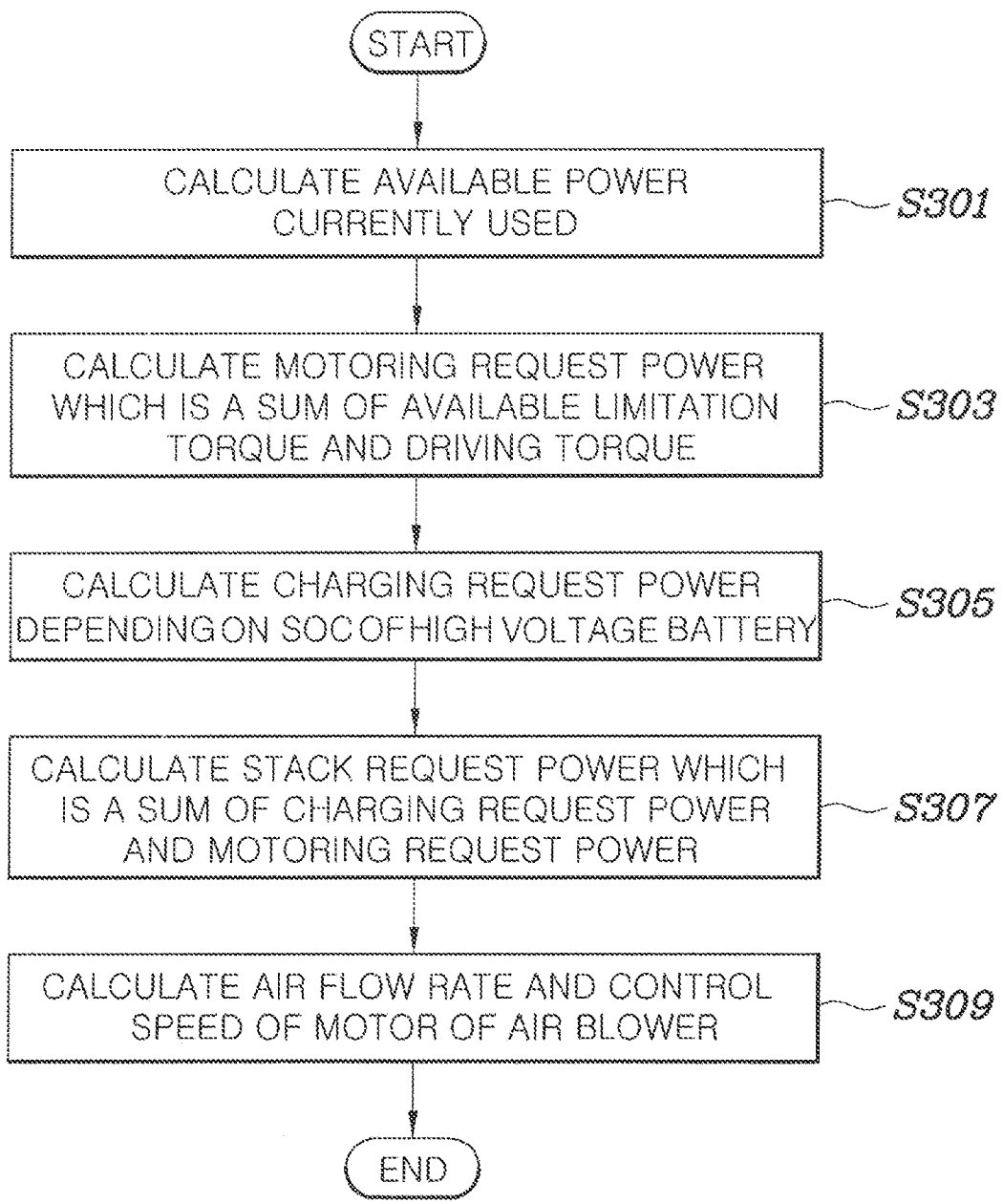
FIG. 3 is a diagram illustrating a method for controlling an air supply of a fuel cell vehicle according to an exemplary embodiment of the present invention.

FIG. 3 is a diagram illustrating a method for controlling an air supply of a fuel cell vehicle according to an exemplary embodiment of the present invention. Referring to FIGS. 1 to 3, the vehicle controller calculates the available power 240 which may be currently used (S301). The vehicle controller calculates the available limitation torque 242 based on the available power 240 and calculates the motoring request power 250 by summing the driving torque 230 corresponding to the power required in the driving motor 40 based on a degree of engagement of the accelerator pedal and the calculated available limitation torque 242 (S303). Further, unlike this, the vehicle controller calculates the charging request power 260 which is power required for the SOC holding control of the high voltage battery 20 (S305). The stack request power 270 of the fuel cell 10 is calculated by summing the charging request power 260 and the motoring request power 250 (S307). The vehicle controller may control the speed of the motor 34 of the air blower 30 to control the air flow rate required in the fuel cell 10 based on the stack request power (S309).

That is, the method for controlling an air supply of a fuel cell vehicle according to the exemplary embodiment of the present invention may limit the torque value within the available power 240 which may be used currently, increase the stack request power 270 to be able reflect the acceleration intention depending on the pushed degrees of the accelerator pedal of the driver, and increase the available power 240 which may be used to be able to increase the available limitation torque 242.

Figure 4:
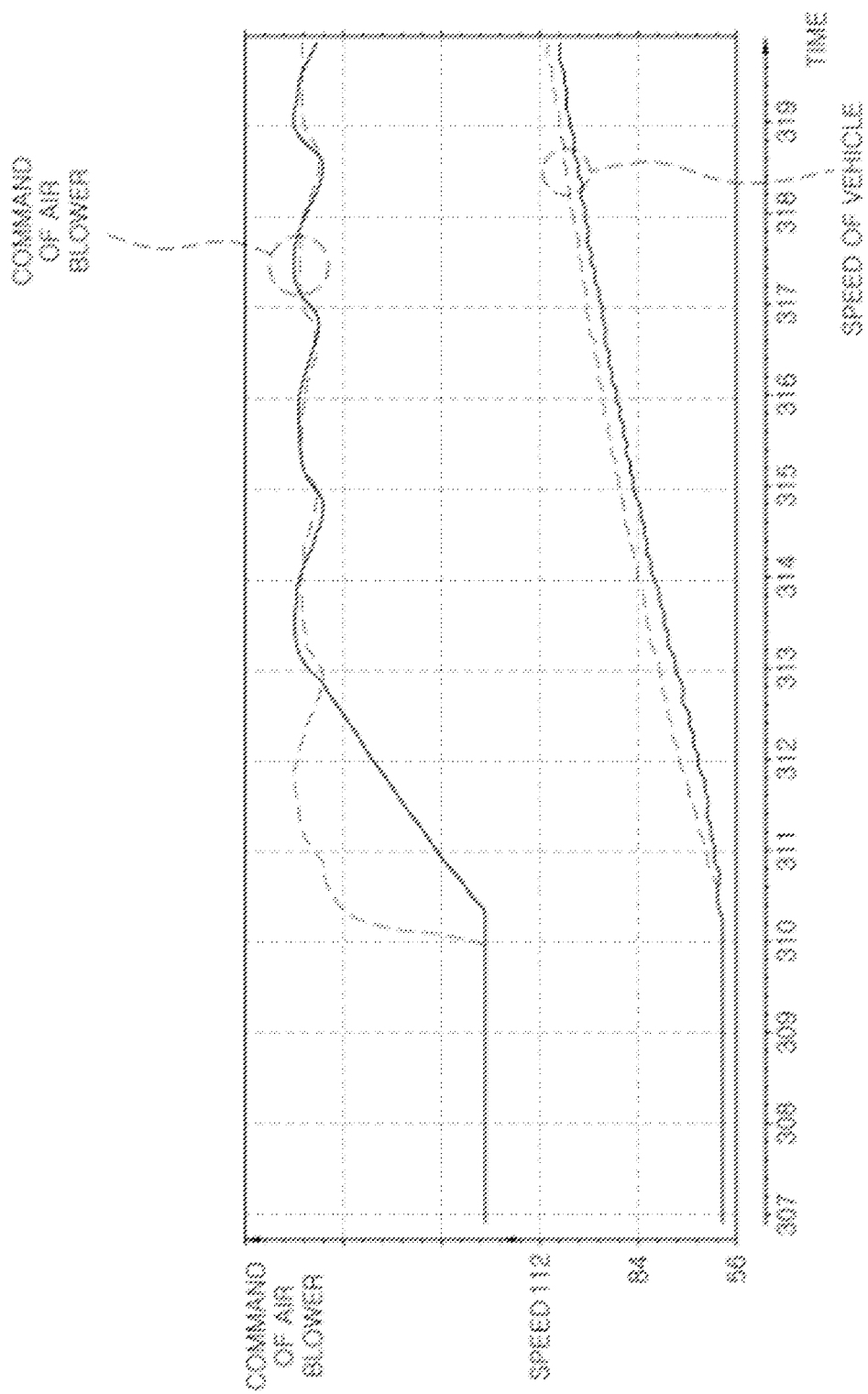
FIG. 4 is a simulation result table obtained by applying the method for controlling an air supply of a fuel cell vehicle according to the exemplary embodiment of the present invention.

FIG. 4 is a simulation result table obtained by applying the method for controlling an air supply of a fuel cell vehicle according to the exemplary embodiment of the present invention. FIG. 4 is a graph illustrating the air blower rotating speed control command signal and the speed of the fuel cell vehicle according to the related art which are represented by a dotted line and a graph illustrating the air blower 30 rotating speed control command signal and the speed of the fuel cell vehicle in the case of using the method for controlling an air supply of a vehicle fuel vehicle. These graphs illustrate the application of the control command signal and the speed of the vehicle with the passage of time.

The air blower 30 may be configured to supply only the air supply quantity corresponding to the air supply quantity required in the fuel cell 10, depending on a final torque value 232 calculated within the available power 240 which is a sum of the currently available power of the fuel cell 10 which may be calculated based on the amount of air currently being supplied and the discharge power calculated in the high voltage battery 20, the stack request power 270 calculated based on the final torque value 232, and the control of the speed of the motor 34 of the air blower 30. Therefore, in the case of the air supply control according to the exemplary embodiment of the present invention, a command to rotate the fan of the air blower 30 may be applied at a later time than the related art and thus is a more accurate control method and system.

That is, as the air is supplied by rotatably driving the air blower 30 later than at the time of performing the control based on the pushed degree of the accelerator pedal, the loss occurring due to a surplus of air from the air blower 30 according to the related art may be reduced, and thus the fuel efficiency of the fuel cell vehicle may be improved. Further, in the case of the driving of the air blower 30 according to the exemplary embodiment of the present invention, it may be appreciated that there is little difference in the acceleration performance as compared with the related art. In detail, the acceleration performance reaches 100 kph in the case of the related art and reaches 96 kph in the case of the exemplary embodiment of the present invention, such that there is substantially little difference in the acceleration performance between the related art and the present invention.

According to the method for controlling an air supply of a fuel cell vehicle according to the exemplary embodiments of the present invention, the air supply quantity is controlled by calculating the power required in the fuel cell stack based on the available power which may be currently used in the vehicle and calculating the actually required air supply quantity, thereby reducing the loss occurring due to the excessive supply of air and improving the fuel efficiency of the fuel cell vehicle.

Further, the reduction in performance due to the drying of the inside of the fuel cell which may occur due to the excessive supply of air may be prevented. Therefore, the performance of the fuel cell may be kept constant during the driving.

Although the present invention has been described with reference to the embodiments shown in the accompanying drawings, they are only examples. It will be appreciated by those skilled in the art that various modifications and equivalent other embodiments an possible from the present invention. Accordingly, the actual technical protection scope of the present invention must be determined by the spirit of the appended claims.

What is claimed is:

1. A method for controlling an air supply of a fuel cell vehicle, comprising:
    calculating, by a controller, an available power of the fuel cell vehicle which is calculated based on a currently available power of the fuel cell and discharge power calculated in a battery;
    calculating, by the controller, a motoring request power of a driving motor, based on the calculated available power and power required in the driving motor;
    calculating, by the controller, stack request power required in the fuel cell based on a required charging request power depending on a state of charge (SOC) of the battery and the calculated motoring request power; and
    controlling the air supply to the fuel cell depending on the calculated stack request power,
    wherein the motoring request power is calculated based on a final torque value which is a sum of an available limitation torque and a driving torque,
    wherein the available limitation torque is calculated based on the available power, and
    wherein the driving torque is calculated depending on a motion of an accelerator pedal.

2. The method of claim 1, wherein the currently available power of the fuel cell is determined by an air supply quantity which is currently supplied to the fuel cell.

3. The method of claim 1, further comprising:
    driving the driving motor based on the final torque value.

4. The method of claim 1, wherein the charging request power is determined based on a difference between a targeted SOC and a current SOC of the battery.

5. The method of claim 1, wherein in the controlling, an air flow rate required in the fuel cell is calculated based on the stack request power which is the sum of the motoring request power and the charging request power, and a speed of a motor of an air blower is controlled depending on the calculated air flow rate.

6. A non-transitory computer readable medium containing program instructions executed by a processor within a controller, the computer readable medium comprising:
    program instructions that calculate an available power of a fuel cell vehicle which is calculated based on a currently available power of the fuel cell and discharge power calculated in a battery;
    program instructions that calculate a motoring request power of a driving motor, based on the calculated available power and power required in the driving motor;
    program instructions that calculate stack request power required in the fuel cell based on a required charging request power depending on a state of charge (SOC) of the battery and the calculated motoring request power; and
    program instructions that control the air supply to the fuel cell depending on the calculated stack request power,
    wherein the motoring request power is calculated based on a final torque value which is a sum of an available limitation torque and a driving torque,
    wherein the available limitation torque is calculated based on the available power, and
    wherein the driving torque is calculated depending on a motion of an accelerator pedal.

7. The non-transitory computer readable medium of claim 6, wherein the currently available power of the fuel cell is determined by an air supply quantity which is currently supplied to the fuel cell.

8. The non-transitory computer readable medium of claim 6, further comprising:
    program instructions that drive the driving motor based on the final torque value.

9. The non-transitory computer readable medium of claim 6, wherein the charging request power is determined based on a difference between a targeted SOC and a current SOC of the battery.

10. The non-transitory computer readable medium of claim 6, wherein an air flow rate required in the fuel cell is calculated based on the stack request power which is the sum of the motoring request power, and the charging request power and a speed of a motor of an air blower is controlled depending on the calculated air flow rate.

\* \* \* \* \*